US005969672A

United States Patent [19]

Brenner

[11] Patent Number: 5,969,672

[45] Date of Patent: Oct. 19, 1999

[54] GPS SIGNAL FAULT ISOLATION MONITOR

[75] Inventor: Mats A. Brenner, Plymouth, Minn.

[73] Assignee: Honeywell Inc., Minneapolis, Minn.

[21] Appl. No.: 09/118,046

[22] Filed: Jul. 17, 1998

[51] Int. Cl.[6] .............................. G01S 5/02; H04B 7/185

[52] U.S. Cl. ...................................... 342/357.06; 701/213

[58] Field of Search ......................... 342/357.06, 357.12, 342/358; 701/213; 455/12.1

[56] References Cited

U.S. PATENT DOCUMENTS

| | | | |
|---|---|---|---|
| 5,606,506 | 2/1997 | Kyrtsos | 364/449.1 |
| 5,629,855 | 5/1997 | Kyrtsos et al. | 364/460 |
| 5,757,317 | 5/1998 | Buchler et al. | 342/357 |
| 5,787,384 | 7/1998 | Johnson | 701/216 |

OTHER PUBLICATIONS

Article "Implementation of a RAIM Monitor in a GPS Receiver and an Integrated GPS/IRS" published by the Institution of Navigation, Alexandria, VA was discussed in the specification.

Patent Application entitled "Navigation System with Solution Separation Apparatus for Detecting Accuracy Failure" Serial No. 08/721,232 was discussed in the specification.

*Primary Examiner*—Thomas H. Tarcza
*Assistant Examiner*—Dao L. Phan
*Attorney, Agent, or Firm*—Charles J. Ungemach

[57] ABSTRACT

A system to determine, from inertial reference apparatus and from GPS receiver apparatus, acceleration signals along a predetermined axis to determine the failure of a GPS satellite signal by comparison of the acceleration signals and to monitor newly acquired GPS satellite signals to determine if a satellite drift was present prior to acquisition.

15 Claims, 2 Drawing Sheets

GPS SIGNAL FAULT ISOLATION MONITOR

BACKGROUND OF THE INVENTION

1. Field of the Invention

The present invention relates generally to aircraft navigation and more particularly to a system employing a Global Positioning System(GPS) and an Inertial Reference System (IRS) to allow for an early determination of when a satellite signal becomes undependable and when a newly acquired satellite signal is undependable.

2. Description of the Prior Art

In the prior art, GPS systems have been used to determine aircraft position by receiving signals from a plurality of satellites. The signals each have information as to the position of the satellites and the time of transmission so that the GPS receiver, on the aircraft, can calculate its own position. Since there are four variables (position in 3 axes and time), signals from at least 4 satellites are necessary for a determination of receiver position. If there are at least five satellites having good geometry each subset of four signals can be used for positioning and they can be compared with each other to determine if one of the signals is in error (Fail safe). If there are at least six satellites in view, then, when there is a faulty signal, it is possible to use the groupings to determine which signal is in error (Fail operational). This procedure has heretofore been accomplished with a system identified as RAIM (Receiver Autonomous Integrity Monitor)which is described in a Honeywell Inc. article titled "Implementation of a RAIM Monitor in a GPS Receiver and an Integrated GPS/IRS" found in a publication entitled Global Positioning System Volume V published by the Institute of Navigation, Alexandria Va.

Since RAIM cannot detect an erroneous satellite signal with only four satellites or identify which signal is in error with only five satellites, the pilot cannot rely on the position information he receives in these situations and the GPS input must be disregarded. Accordingly, a need has arisen to provide a system which can produce a reliable output when only four satellites are in view.

In a patent application entitled "Navigation System with Solution Separation Apparatus for Detecting Accuracy Failure" Ser. No. 08/712,232, filed Sep. 11, 1996 and assigned to the assignee of the present invention, one solution to this problem is disclosed. More particularly, that application discloses an integrity monitor and positioning algorithm which receives signals from a plurality of remote transmitters, detects failures and determines a protection limit (i.e. the furthest statistical distance by which the position determined by the apparatus will have an almost certain probability of being bounded in a situation where one satellite is in error). This positioning algorithm preferably uses Kalman filtering techniques and incorporates inertial reference data therein to enhance the detection capability. While this system allows confident use of signals from four satellites for a limited time, the protection limit provided by the Kalman filter bank will sometimes exceed the required protection for the most stringent phases of flight (non-precision approach and terminal area navigation) and is therefore not sufficiently available. Furthermore, the bank of Kalman filters is computationally expensive and complex to implement in other equipment than the inertial reference unit. Therefore, a need has arisen for a system which is less complex and expensive, which can more readily be incorporated into equipment of suppliers and which can detect satellite signal errors at an early point in the operation.

SUMMARY OF THE INVENTION

The present invention addresses these and other needs by:

1) providing a new acceleration monitor that produces a first acceleration output along a predetermined axis from the GPS signals and a second acceleration output along the same predetermined axis from the inertial reference units (IRU's). Although the IRU outputs are not very accurate for determining position, the measurement of acceleration along a predetermined axis is quite accurate. Accordingly, the IRU acceleration signal is compared to the GPS acceleration signal along the predetermined axis. When there is an error greater than a predetermined amount, the faulty satellite signal is identified and can be eliminated from the calculations. Thus only four satellites are necessary for continued operation. In the case of a signal drift, which may be considered as a ramp output, the initial change at the beginning of the ramp causes an acceleration transient which is detected by the acceleration monitor so that early identification of this condition is made.

2) Providing a new satellite drift monitor to determine if a drift started before the satellite is seen, a situation not covered by the acceleration monitor since the acceleration monitor would not see the transient occurring at the start of the ramp, in which event the failure condition will not be identified. In the present invention, this problem is solved with a novel new satellite drift monitor referred to herein as a zero crossing RAIM (or Z-RAIM) monitor that detects drift in a newly acquired satellite.

Both of these features will be explained in detail below but the acceleration monitor is claimed in the present invention and the new satellite drift monitor is claimed in copending application Ser. No. 09/118,294 filed on even date herewith and assigned to the present assignee.

DETAILED DESCRIPTION

Figure 1:
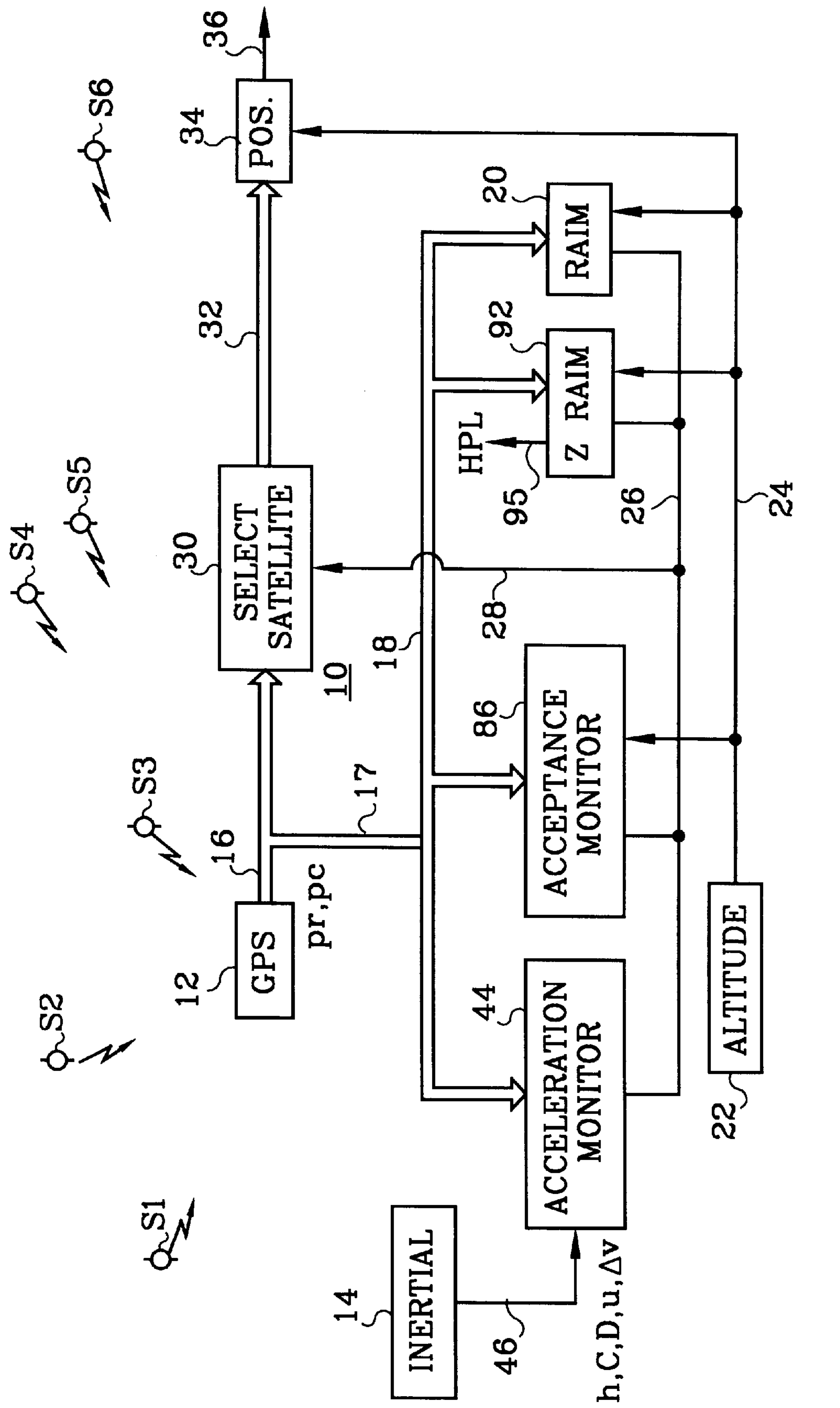
FIG. 1 shows a schematic block diagram of the system utilizing the present invention.

Referring to FIG. 1 wherein a system 10 for use in aircraft navigation is shown comprising a GPS receiver 12 and an inertial reference unit 14. GPS receiver 12 is of a type well known in the art which operates to receive signals from a plurality of satellites, e.g. S1–S6 in FIG. 1, indicative of their positions and of the time of transmission.

While 6 satellites have been shown, it will be understood, that more or less than 6 satellites may be in view of the GPS receiver 12 and that the number may change over a period of time. GPS receiver 12 operates on the signals from satellites S1–S6 to determine the position of the receiver and to produce the GPS code based pseudo range measurements, pr, to each satellite. Also, by tracking and counting the cycles (including fractions of cycles) in the carrier from each satellite, the GPS receiver 12 provides the accumulated carrier count, pc, which can be used to obtain the change of pseudo range over a time Δt according to the equation:

$$\Delta pr=\Delta pc=pc(t+\Delta t)-pc(t) \quad (1)$$

The change of the pseudo range obtained by differencing the carrier count is accurate to within centimeters (0.01 meter) while the pseudo range change formed by differencing the pseudo range measurements is accurate to within 2 to 5 meters. The code based change in pseudo range Δpr, the carrier based change in pseudo range, Δpc, or a combination thereof, referred to as a smooth ed code measurement are used in the present invention as will be described below.

The pr and pc signals are provided as outputs represented by a path 16 from GPS receiver 12 and, via paths 17 and 18 to a standard RAIM shown in box 20 which also receives a pressure altitude signal from an altitude sensing means 22 via a path 24. In the event that an undependable satellite signal is encountered and detected by the standard RAIM 20, a deselect signal is presented from RAIM 20 as an output represented by a path 26. This occurs if there are at least 6 satellites in view with good geometry, in which case, groups of five satellite signals can be compared so as to determine which one, if any, of them is faulty. If one is so identified, then this information is passed (via path 26 and a path 28) to a satellite selection function represented by a box 30 which also receives the GPS pr and pc from path 16. The satellite selection function 30 eliminates the faulty satellite signal and passes the remaining valid signals as an output represented by a path 32 to a Position function represented by box 34. Position function 34 also receives a pressure altitude signal from an Altitude Sensing means 22 via path 24 and produces an output indicative of the aircraft position (as represented by a path 36) to downstream equipment such as indicators or flight management systems (not shown). If there are only 5 satellites in view with good geometry, then groups of four satellite signals can still be compared against at least one other satellite signal so as to determine if any of them are faulty but since the faulty satellite cannot be identified no de-selection can be performed. In such a case the downstream equipment and the pilot will be notified that the GPS signals should not be used (this signal is not shown in FIG. 1).

In accordance with the present invention, the signal output represented by path 16 is provided via paths 17 and 18 to an acceleration monitor as represented by a box 44. The acceleration monitor 44 also receives an input from the inertial reference unit 14 (which is also well known in the art and comprises a plurality of gyros and accelerometers) that produces outputs as represented by a line 46 indicative of h (altitude), C, (attitude matrix), D (latitude, longitude, wander angle matrix), v (velocity) and Δv (change of velocity). A minimum of 3 gyros and 3 accelerometers are employed, but to ensure fail safe or fail operational operation and high reliability, two or three redundant systems are preferably employed. The Δv signal from path 46 and the pr, pc signals from paths 16, 17 and 18 are used by the Acceleration Monitor, 44, of the present invention by an operation which will be better understood with reference to FIG. 2.

Figure 2:
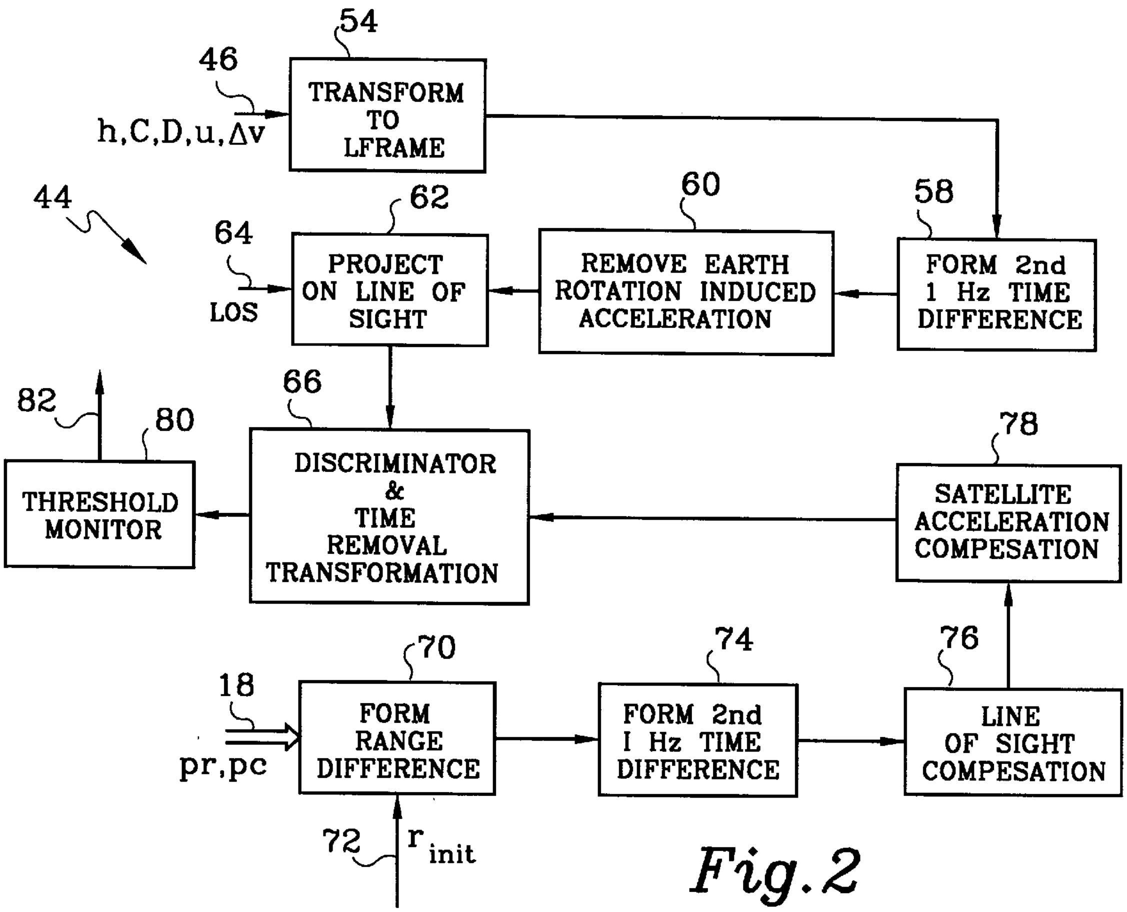
FIG. 2 is a block diagram showing the operation of the acceleration monitor of the present invention; and, FIGS. 3A and 3B are graphs showing how the new satellite drift monitor of the above mentioned copending application operates.

In FIG. 2, the Acceleration Monitor 44 is shown receiving the inertial signals h, C, D v, and Δv over a path shown by arrow 46 which corresponds to FIG. 1 and receiving the GPS input, pr and pc, over a path shown by arrow 18 which corresponds to FIG. 1.

The inertial signal Δv, consists of filtered velocity increments at a 10–60 Hz rate which are provided to a function box 54 labeled "Transform to L frame". Function box 54 also receives the attitude input C, shown by arrow 46 and transforms the filtered velocity increments to the local vertical frame, L, and outputs the transformed increments to a function represented by a box 58 labeled "Form 2nd 1 Hz Time Difference". In box 58 "double position difference signals" (i.e. signals representing the difference in the change of position in the current Δt interval and the change of position in the previous Δt interval) along each axis are formed by integrating the inertial acceleration (i.e. the transformed high rate velocity increments). The output of the function 58 reflects an inertially measured acceleration which contains earth rotation induced acceleration components that will not be present in the acceleration derived from the GPS signal (to be explained below). Accordingly, the output of function 58 is provided as input to a function represented by a box 60 labeled "Remove Earth Rotation Induced Acceleration" where the undesired earth rotation components are removed. Finally, since the acceleration derived from the GPS signal will only be available in the direction of the satellite (along the line of sight), the inertially based reference signal from function 60 is presented to a function represented by a box 62 labeled "Project Along Line Of Sight" which also receives a signal, LOS (unit vector along the line of sight to the satellite) shown by arrow 64 and the output of function 62 is an inertial double position difference projected along the line of sight to the satellite. This signal is presented to a function represented by box 66 labeled "Discriminator & time removal transformation" where the acceleration monitor discriminator is formed.

With respect to the GPS signal, the pseudo range measurements pr and accumulated carrier cycle counts pc for all tracked satellites are presented from path 18 to a function represented by a box 70 labeled "Form Range Difference" which also receives an initial GPS position, $r_{init}$, shown on an input represented by arrow 72 which is the GPS position at the time of initialization and received from the position function 34 in FIG. 1. As mentioned above, the signal, pc, consists of accumulated carrier cycles (each cycle corresponds to about 0.19 m position change in the usual satellite signal) and the signal pr are code based pseudo range measurements. The signals pr, pc or any combination thereof (smoothed measurements) include the motion of the satellite and function 70 operates to remove the satellite motion component and provide the result to a function represented by a box 74 labeled "Form 2nd 1 Hz Time Difference". The double difference signal (i.e. the difference in the change of cycle count (or smoothed pseudo range) in the current Δt interval and the change of cycle count (or smoothed pseudo range) in the previous Δt interval) is formed by function 76 and an output which represents the acceleration of the GPS receiver (but which also contains components that relate to the change in the line of sight vector at the current position and the line of sight vector at the initial reference position) is provided to a function represented by a box 76 labeled "Line of Sight Compensation". Now, the satellite acceleration is projected differently when seen from the current position versus when seen from the initial reference position. Accordingly, the output formed by function 76 is one where the components related to the line of sight are removed. The output from function 76 is presented to a function represented by a box 78 labeled "Satellite Acceleration Compensation". The cycle count includes the motion of the satellite and function 78 operates to remove the satellite motion acceleration component. The final result is a GPS signal based double position difference along the line of sight and this is provided to the function represented by box 66. The "Discriminator & Time Removal Transformation" function 66 operates on the GPS and Inertial Reference acceleration signals from functions 78 and 62 respectively to form a discriminator by differencing the two signals. This function also subtracts an average (over all of the satellites) of all discriminators from each satellite specific discriminator thereby eliminating the receiver clock offset. This signal is presented to a function represented by a box 80 where the discriminator output is averaged over time and compared to a fixed threshold value to produce a deselected signal on a line 82 which is used to deselect any satellite whose acceleration exceeds the threshold. It should be noted that all of the functions performed by function boxes described above can be performed by a computer program with each function being readily programmable by one having ordinary skill in the programming art.

In FIG. 1, the deselect signal on line 82 of FIG. 2 is shown being provided via lines 26 and 28 to the Select Satellite function 30 and the deselected satellite signal will not proceed to the Positioning function 34.

An Acceptance Monitor 86 is shown in FIG. 1 receiving the GPS signal over paths 16, 17 and 18 and further receiving a pressure altitude signal from the Altitude box 22 over path 24. The Acceptance Monitor 86 is used in the art to detect GPS signals which are obviously incorrect because, for example the satellite pseudo range is far out of reasonable bounds. When such an erroneous satellite is received, the Acceptance Monitor 86 produces a deselect signal to path 26 and via path 28 to the Select Satellite function 30 which then operates to prevent the erroneous signals from being used by the Positioning function 34.

A new satellite drift monitor", or "Z RAIM" is shown as a box 92 which receives the GPS signals over paths 16, 17 and 18 and the pressure altitude signal over path 34. Z RAIM 92 provides an output indicative of the Horizontal Protection Limit, HPL, to the pilot or to downstream aircraft equipment such as the Flight Management System (not shown) over a path 95

The new satellite drift monitor or Z RAIM 92 of the present invention (which is claimed in the above referred to copending application) operates to determine if a drift has already begun when a signal from a new satellite is first acquired. This is explained with reference to FIGS. 3A and 3B.

Figure 3A:
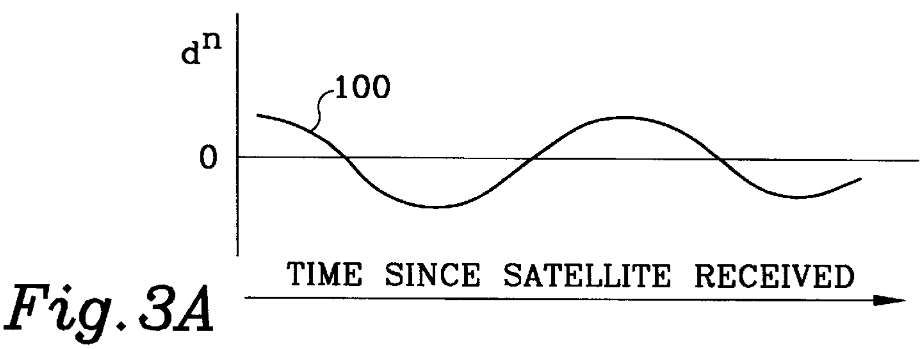
Figure 3B:
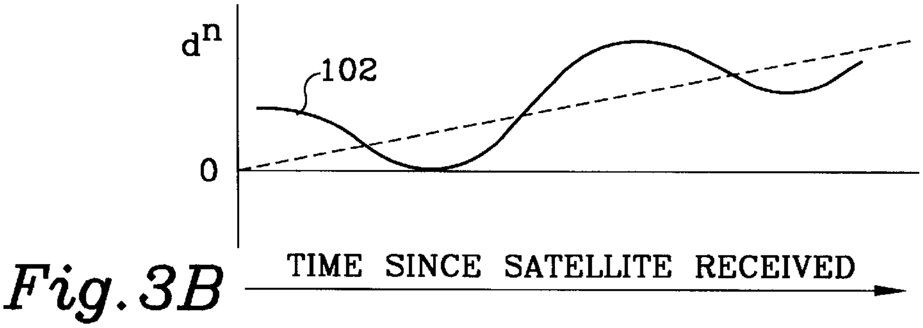

Assuming that there are N satellites with good geometry, the RAIM discriminator, as known in the art for the nth satellite, is formed by the equation:

$$d^n = \sum_{k=1}^{N} b_k^n \Delta pr_k \tag{2}$$

Where $b_k^n$ is a well known satellite geometry dependent coefficient as seen in the above referred to publication, N is the number of satellites, k indicates the kth satellite and $\Delta pr_k$ is the difference between the measured pseudo range (or smoothed pseudo range) and the predicted pseudo range for the kth satellite. Due to selective availability (SA, a deliberate noise signal superimposed on the output of the GPS by the DOD), the discriminator will vary as seen in FIG. 3A The new satellite error bound, $\epsilon$, defined to have a predetermined confidence level of 1-$P_{md}$ which is typically 99.9%, , is defined by the equation:

$$\varepsilon = |d^n| + K_{md}\sigma_{SA} / |b_n^n|. \tag{3}$$

Where $|d^n|$ is the absolute value of the discriminator $d^n$, $K_{md}$ is the statistical sigma number corresponding to the missed detection probability $p_{md}$, $\sigma_{SA}$ is the selective availability noise sigma and $|b_n^n|$ is the absolute value of the satellite geometry dependent coefficient in equation (2) where the upper and lower indices are the same and equal to the satellite index, n.

Based on the properties of the SA noise, the discriminator will cross zero or reach a minimum value from time to time i.e. at least every 5 minutes. As the discriminator crosses zero or reaches the minimum absolute value $|d^n|_{min}$, the error in the estimate of the 1$p_{md}$ error bound is at a minimum:

$$\varepsilon_{\min} = |d^n|_{\min} + K_{md}\sigma_{SA} / |b_n^n|. \tag{4}$$

and the estimated drift rate, r, at a 1-$p_{md}$ confidence level is $$r = \varepsilon_{\min} / t \tag{5}$$

Where t is the time since the satellite was first received.
Where t is the time since the satellite was first received.

As t increases, more accurate drift error bounds are obtained for each encountered minimum $|d^n|_{min}$. Note that if the drift error bound is calculated as a minimum recursively according to the equation $$r(t) = \min(r(t-\Delta t), \epsilon/t) \tag{6}$$

where $\Delta$t is the time step, the result will be the same.

The satellite error limit, SEL, is the minimum of the current satellite error bound $\epsilon$ and the previous satellite error limit with the estimated 1-$p_{md}$ drift error bound added. This is recursively determined by the equation:

$$\mathrm{SEL}(t) = \min(\epsilon, \mathrm{SEL}(t-\Delta t) + r\Delta t) \tag{7}$$

Where $\Delta$t is the time step.

The horizontal protection limit, HPL (a required output in avionics equipment) associated with satellite n, can be calculated as:

$$\mathrm{HPL}_n = t_{hn}\mathrm{SEL} + K_{md} rf \sigma_{SA}. \tag{8}$$

Where $K_{md}$ is the statistical sigma number corresponding to the missed detection probability $p_{md}$, rf is a reduction factor less than 1 and $$t_{hn} = \sqrt{t_{n1}^2 + t_{n2}^2}$$

where $t_{n1}$ and $t_{n2}$ are elements of the least square solution matrix, T, that is well known in the art. Even if no action is taken to remove a satellite with an initial drift, the horizontal protection limit, $HPL_{n,}$, associated with this satellite, will always bound the error as long as the drift is constant i.e. assure a fail safe operation. If it is not constant, the Acceleration Monitor 44 of the present invention should detect an acceleration. To achieve fail operation capability, a de-selection of a new satellite via paths 22, 23 and function 24 in FIG. 1 should be performed if the rate, r, exceeds a predetermined time dependent threshold.

The use of boxes and paths herein has been for purposes of explaining the operation of the preferred embodiment and it should be understood that these boxes and paths may be implemented either by software or hardware or a combination of both.

It is therefore seen that I have provided a system which can produce a reliable output when only four satellites are in view under the assumption that a GPS satellite failure will be preceded by or involve acceleration exceeding a predetermined level. It is also seen that I have provided a system which is less complex and expensive, which can more readily be incorporated into existing equipment and which can detect satellite signal errors at an early point in the operation. Many alternate embodiments will occur to those having skill in the art and the invention disclosed herein may be embodied in other specific forms without departing from the spirit of the present invention. Accordingly, the embodiments described herein are to be considered in all respects illustrative and not restrictive and the scope of the invention is to be indicated by the appended claims, rather than by the foregoing description, and all changes which come within the meaning and range of equivalency of the claims are intended to be embraced therein.

I claim:

1. A system for use in a vehicle receiving signals from an inertial reference unit and a GPS receiver, receiving signals from a plurality of satellites, comprising:

an acceleration monitor operable to utilize the signals from the inertial reference unit to produce a first signal indicative of the acceleration of the vehicle along a first axis and operable to utilize the signals from the GPS receiver to produce a second signal indicative of the acceleration of the vehicle along the first axis said acceleration monitor comparing the first and second signals and producing a third signal when the difference between the first and second signals is greater than a predetermined threshold.

2. Apparatus according to claim 1 wherein the system is used for positioning the vehicle and further includes satellite selection means for receiving the third signal and operable to exclude an erroneous signal from the satellites from being used for positioning.

3. Apparatus according to claim 1 wherein the first axis is the line of sight between the vehicle and a satellite.

4. Apparatus according to claim 1 wherein the GPS receiver determines a pseudo range to a satellite and the second signal is calculated using the pseudo range.

5. Apparatus according to claim 1 wherein the signals from the satellites include a carrier having a cyclical characteristic and the GPS receiver counts the cycles to determine a change in the carrier count and the second signal is calculated from the change in the carrier count.

6. Apparatus according to claim 5 wherein the GPS receiver determines the change in the carrier count and the pseudo range to a satellite and the second signal is calculated from a quantity that is obtained combining the change of carrier count and the pseudo ranges.

7. Apparatus according to claim 1 wherein the second signal is compensated for satellite acceleration and line of sight changes.

8. Apparatus according to claim 1 further including a drift monitor which operates to 1) receive signals from newly acquired satellites and 2) to produce a fourth signal when a signal from a newly acquired satellite has begun to drift prior to its acquisition.

9. Apparatus according to claim 5 further including a drift monitor which operates to 1) receive signals from newly acquired satellites and 2) to produce a fourth signal when a signal from a newly acquired satellite has begun to drift prior to its acquisition.

10. Apparatus according to claim 6 further including a drift monitor which operates to 1) receive signals from newly acquired satellites and 2) to produce a fourth signal when a signal from a newly acquired satellite has begun to drift prior to its acquisition.

11. Apparatus according to claim 1 further including a new satellite monitor to receive signals from newly acquired satellites and to produce a horizontal protection limit bounding the position error induced by an initial satellite drift at any desired confidence level.

12. Apparatus according to claim 5 further including a new satellite monitor to receive signals from newly acquired satellites and to produce a horizontal protection limit bounding the position error induced by an initial satellite drift at any desired confidence level.

13. Apparatus according to claim 6 further including a new satellite monitor to receive signals from newly acquired satellites and to produce a horizontal protection limit bounding the position error induced by an initial satellite drift at any desired confidence level.

14. In a system which includes an inertial reference unit and a receiver which receives GPS signals from a plurality of satellites, the method of providing an indication that a GPS signal failure has occurred comprising the steps of:

A. determining from the inertial reference unit the acceleration of the vehicle along a first axis;

B. determining from the GPS signals the acceleration of the vehicle along the first axis;

C. comparing the acceleration as determined from step A with the acceleration as determined from step B; and, D. producing a first output whenever the comparison in step C is greater than a predetermined amount.

15. The method of claim 14 further including the steps of:

E. determining when the signal from a newly acquired satellite has begun to drift prior to acquisition; and F. producing a second output whenever a drift is determined in step E.

* * * * *